(12) United States Patent
Bustin

(10) Patent No.: US 10,798,362 B2
(45) Date of Patent: Oct. 6, 2020

(54) PARALLAX CORRECTION DEVICE AND METHOD IN BLENDED OPTICAL SYSTEM FOR USE OVER A RANGE OF TEMPERATURES

(71) Applicant: Qioptiq Limited, St. Asaph (GB)

(72) Inventor: Nicholas Karl Bustin, Hankelow (GB)

(73) Assignee: Qioptiq Limited, St. Asaph (GB)

( * ) Notice: Subject to any disclaimer, the term of this patent is extended or adjusted under 35 U.S.C. 154(b) by 0 days.

(21) Appl. No.: 16/372,545

(22) Filed: Apr. 2, 2019

(65) Prior Publication Data

US 2019/0230335 A1    Jul. 25, 2019

Related U.S. Application Data

(62) Division of application No. 15/182,903, filed on Jun. 15, 2016, now Pat. No. 10,291,897.

(30) Foreign Application Priority Data

Jun. 18, 2015    (GB) .................................. 1510725.3

(51) Int. Cl.
*G02B 27/30* (2006.01)
*G02B 7/02* (2006.01)
*G02B 7/08* (2006.01)
(Continued)

(52) U.S. Cl.
CPC ........... *H04N 13/128* (2018.05); *G02B 7/028* (2013.01); *G02B 7/08* (2013.01); *G02B 23/125* (2013.01);
(Continued)

(58) Field of Classification Search
CPC ............. H04N 13/0022; H04N 13/004; H04N 13/0051; H04N 13/0225; H04N 13/0235;
(Continued)

(56) References Cited

U.S. PATENT DOCUMENTS 7,307,793 B2    12/2007    Ottney et al.
8,235,590 B2     8/2012    Sheard et al.
(Continued)

FOREIGN PATENT DOCUMENTS

EP    2938061 A1    10/2015
EP    2690864       11/2018
(Continued)

OTHER PUBLICATIONS

Combined Search and Exam Report for GB1510725.3, dated Nov. 17, 2015.
(Continued)

*Primary Examiner* — Collin X Beatty
*Assistant Examiner* — Grant A Gagnon
(74) *Attorney, Agent, or Firm* — Peter A. Nieves; Sheehan Phinney Bass & Green PA

(57) ABSTRACT

A blended optical device includes a first objective with a first axis and a first image position adjustment means for adjusting the position of a first image. An electronic control circuitry is configured to control the first adjustment means to adjust a position of the first image. A second objective includes a second axis and a variable focus mechanism, and a blender configured to form a blended image from the first image and a second image. The electronic control circuitry is configured to receive data from the second objective regarding a range to a target of the second objective as a function of the focus setting, and to adjust the position of the first image so that the blended image is corrected for parallax errors.

14 Claims, 5 Drawing Sheets

(51) Int. Cl.
*H04N 13/128* (2018.01)
*H04N 13/156* (2018.01)
*H04N 13/167* (2018.01)
*H04N 13/225* (2018.01)
*H04N 13/236* (2018.01)
*G02B 23/12* (2006.01)
*G06T 7/33* (2017.01)

(52) U.S. Cl.
CPC ............... *G02B 27/30* (2013.01); *G06T 7/33* (2017.01); *H04N 13/156* (2018.05); *H04N 13/167* (2018.05); *H04N 13/225* (2018.05); *H04N 13/236* (2018.05)

(58) Field of Classification Search
CPC ........ G02B 7/028; G02B 7/08; G02B 23/125; G02B 27/30
USPC ......................................................... 359/419
See application file for complete search history.

(56) References Cited

U.S. PATENT DOCUMENTS

| | | |
|---|---|---|
| 2007/0235634 A1 | 10/2007 | Ottney et al. |
| 2008/0291531 A1 | 11/2008 | Heimer |
| 2010/0046577 A1 | 2/2010 | Sheard et al. |
| 2013/0265459 A1 | 10/2013 | Duparre et al. |
| 2014/0267757 A1 | 9/2014 | Abramson et al. |

FOREIGN PATENT DOCUMENTS

| | | |
|---|---|---|
| GB | 2161616 B | 1/1986 |
| WO | 2015021074 A1 | 2/2015 |

OTHER PUBLICATIONS

Partial Search Report for EP1674118.6, dated Nov. 4, 2016.
Combined Search and Exam Report for GB1906200.9, dated Jun. 18, 2015.

PARALLAX CORRECTION DEVICE AND METHOD IN BLENDED OPTICAL SYSTEM FOR USE OVER A RANGE OF TEMPERATURES

CROSS REFERENCE TO RELATED APPLICATION

This application is a divisional of U.S. patent application Ser. No. 15/182,903, filed Jun. 15, 2016, entitled "Parallax Correction Device and Method in Blended Optical System for Use over a Range of Temperatures", which claims priority to United Kingdom Patent Application serial number 1510725.3, filed Jun. 18, 2015, entitled "Parallax Correction Device and Method in Blended Optical System for Use over a Range of Temperatures," which is hereby incorporated by reference herein in its entirety.

FIELD OF THE INVENTION

The present invention relates to optics, and more particularly, is related to blended optical systems.

BACKGROUND OF THE INVENTION

Image blending systems may combine image intensification (II) with thermal sensing. When such systems use more than one aperture with separated optical axes, parallax compensation may be needed.

FIG. 1 shows an exemplary prior art dual aperture optical system 100, with a first aperture 110 and a second aperture 120 directed to a target object 101. The optical system 100 routes a first image 111 from the first aperture 110 through a blending device 150, such as a prism, to an eyepiece 160. Similarly, the optical system 100 routes a second image 121 from the second aperture 120 through the blending device 150 to the eyepiece 160 via a reflector 170. Due to the different perspectives of the first aperture 110 and the second aperture 120, the position of the image of the target 101 within the first aperture image 111 is different from the position of the image of the target 101 within the second aperture image 121. When the first aperture image 111 and the second aperture image 121 are blended by the blending device 150 to form a blended image 161 at the eyepiece 160, the blended image 161 displays parallax errors.

The position of the first image 111 and/or the second image 121 may be corrected so that the images of the target 101 align in the blended image 161. However, this positional correction will only be appropriate for targets at a predetermined distance from the apertures 110, 120. In particular, when the longitudinal axis of the first aperture 110 and the longitudinal axis of the second aperture 120 are aligned such that the blended images of a target at a predetermined distance are aligned in the eyepiece 160, objects at distances other than the predetermined distance are offset in the eyepiece 160. This offset increases as the target distance varies from the predetermined distance. This parallax offset may be corrected by adjusting the position of one image or the other in the eyepiece 160. For example, circuitry may be employed to adjust the position of one image or the other in the eyepiece, such that the images remain aligned even as the distance of the target 101 from the image system 100 changes. Such circuitry is described, for example, by U.S. Patent Publication No. 2007/0235634.

This type of parallax compensation generally uses the distance of the target and the distance between apertures to calculate the image offset correction amount. The distance of the target is determined from the focus setting required to produce a focused image of the target. This requires that the depth of focus of the optics is sufficiently small that a change in object distance causes the object to go out of focus, thereby requiring a change to the focus setting, before a parallax error becomes apparent. However, under certain conditions, such as a large change of temperature, the focus setting may not be a function of the distance of the target alone. Optics with a sufficiently small depth of focus are typically sensitive to thermal defocus, thereby requiring a change to the focus setting when subjected to a large change of temperature. Therefore, the correct image offset for parallax compensation cannot be determined from the focus setting alone under these conditions. There is a need in the industry to address the abovementioned deficiencies.

SUMMARY OF THE INVENTION

Embodiments of the present invention provide a parallax correction device and method in a blended optical system capable of operating over a wide range of temperatures. Briefly described, the present invention is directed to a blended optical device including a first objective with a first axis and a first image position adjustment means for adjusting the position of a first image. An electronic control circuitry is configured to control the first adjustment means to adjust a position of the first image. A second objective includes a second axis and a variable focus mechanism, and a blender configured to form a blended image from the first image and a second image. The electronic control circuitry is configured to receive data from the second objective regarding a range to a target of the second objective as a function of the focus setting, and to adjust the position of the first image so that the blended image is corrected for parallax errors. When both objectives are athermal, the parallax error correction is accurate over a range of temperatures.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

DETAILED DESCRIPTION

Figure 1:
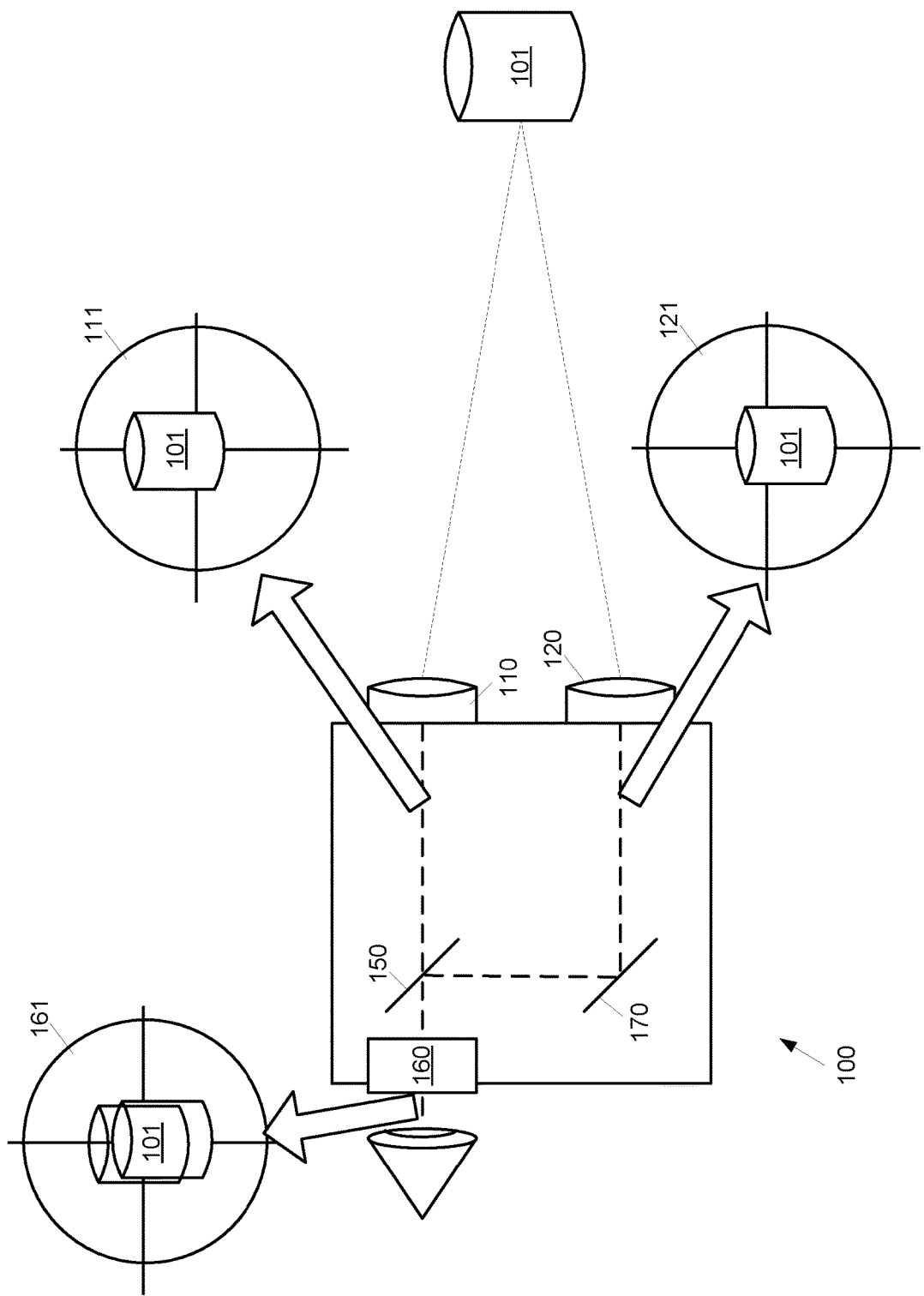
FIG. 1 is a schematic diagram of a prior art optical system uncorrected for parallax errors.

The following definitions are useful for interpreting terms applied to features of the embodiments disclosed herein, and are meant only to define elements within the disclosure. No limitations on terms used within the claims are intended, or should be derived, thereby. Terms used within the appended claims should only be limited by their customary meaning within the applicable arts.

As far as possible, the invention has been described using terms such as "objective," "detector," "display," and "display optics," all of which should be considered to apply in their broadest possible senses.

As used within this disclosure, "thermal defocus" refers to a change in the focus position of an optical aperture on axis with temperature changes due to the variation of the index of refraction (n) with temperature (dn/dT) and the expansion of the optical lens material and the aperture housing material. The expansion and contraction of a material due to temperature changes is governed by a coefficient of thermal expansion $\alpha$ of a material, which has units of $10^{-6}/°$ C. (or ppm/° C.). The change in length (L) of a housing material due to a temperature change ($\Delta T$) is given by $$\Delta L = \alpha_H L \Delta T \quad \text{(Eq. 1)}$$

where $\alpha_H$ is the thermal expansion coefficient of the housing material. The analogous equation quantifying the change in focal length (f) of a lens in air with temperature (T) is given by $$\Delta f = -\gamma f \Delta T \quad \text{(Eq. 2)}$$

where $\gamma$ is the thermal glass constant, which is given by $$\gamma = (dn/dT)/(n-1) - \alpha \quad \text{(Eq. 3)}$$

where $\alpha$ is the thermal expansion coefficient of the optical lens material. In general, thermal defocus is caused by changing the distance between the objective and the focal plane due to expansion or contraction of the housing material. If the change in housing length is equal to the change in focus due to the lens, then the defocus is zero, and the system is considered athermal.

Reference will now be made in detail to embodiments of the present invention, examples of which are illustrated in the accompanying drawings. Wherever possible, the same reference numbers are used in the drawings and the description to refer to the same or like parts.

As described above, previous parallax correction systems for imaging devices were based upon adjusting the position of at least one image component of a blended image based solely on the focus setting position, assuming that the focus setting is a reliable indicator of the distance between the imaging device and the image target. However, these systems do not account for other conditions that may require a change to the focus setting, in particular, thermal defocus of one or more apertures in the imaging device. In order to perform the correction over a range of temperatures, the effect of thermal defocus should be accounted for. Exemplary embodiments achieve this by athermalising the objectives, or alternatively, if the thermal defocus is characterised as a function of temperature, temperature sensors may be used to determine an offset for the focus setting.

Exemplary embodiments of the present invention correct for the parallax error present in blended optical systems using separate apertures. The embodiments achieve this by using the focus setting position of at least one aperture to determine an offset for a displayed image. This requires that the depth of focus of at least one of the apertures is sufficiently small that a change in object distance requires the optics to be refocused before a parallax error becomes apparent. This results in the user effectively experiencing no parallax error, as objects at distances for which parallax exists are sufficiently out of focus to make the error insignificant. The descriptions of the embodiments indicate how parallax correction can be implemented within a blended optical system that is exposed to a wide temperature range, enabling such a system to maintain optical alignment across a wide range of temperatures.

Figure 2:
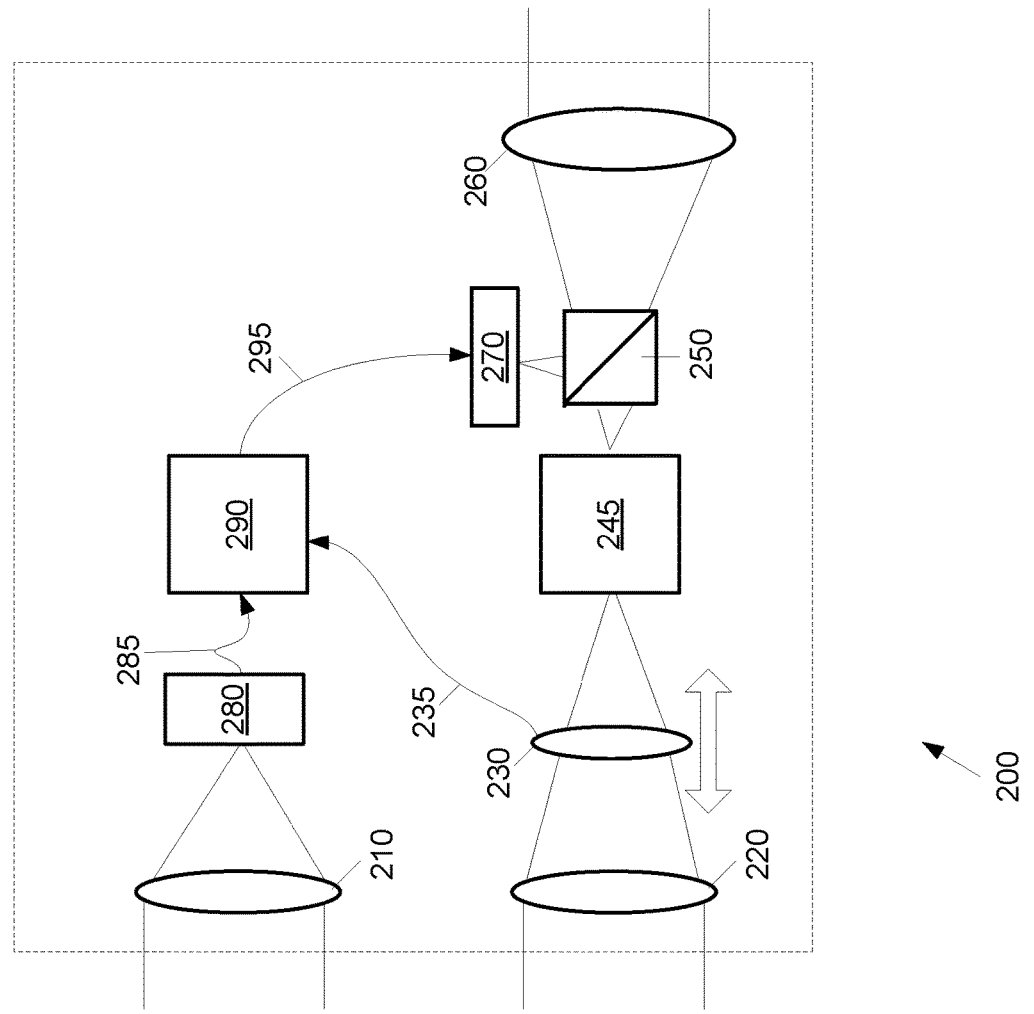
FIG. 2 is a schematic diagram of an exemplary first embodiment of an optical system for correcting parallax errors over a range of temperatures.

FIG. 2 shows a first exemplary embodiment of the invention based upon a blended optical system. A blended optical system 200 includes a first objective 210, for example, a fixed-focus, passively athermalised thermal objective with a first optical axis. A second objective 220 has a second optical axis, for example, a passively athermalised image-intensifier (II) objective having a focus mechanism 230, such as a movable lens. An image from the second objective 220, for example, the image of an object 201, is focused onto an II tube 245. The output from the II tube 245 may be collimated by a collimator 260 so that it may be viewed through a separate sight (not shown). An image blender 250, such as a beam splitter prism, for example, located in or before the collimator 260, allows the collimator 260 to view both the image from the II tube 245 and the image from an electronic display 270. The electronic display 270 is used to display the image from a thermal camera 280. It should be noted that in alternative embodiments the collimator 260 may be omitted, or replaced by another optical element, for example, an eyepiece, magnifier optics, an image detector, or another device.

The range of the object 201 focused upon by the second objective 220 is conveyed to an electronic control circuitry 290. For example, a position of the focus mechanism 230 is conveyed to the electronic control circuitry 290 by a focus mechanism connection 235, such as an electrical or optical lead. The electronic control circuitry 290 is configured to receive a thermal image from the thermal camera 280 via a camera connection 285, which may be an optical or an electrical connection. The electronic control circuitry 290 is configured to convey the thermal image to the electronic display via a display connection 295, which may be an optical or an electrical connection. The position of the focus mechanism 230 is measured by the electronic control circuitry 290, which determines the range to the object 201 accordingly and adjusts the position of the thermal image on the display 270 to eliminate the parallax error for the range at which the second objective 220 is focused. The electronic control circuitry 290 may be implemented, for example, by a computer, as discussed further below. In alternative embodiments the focus mechanism connection 235, the camera connection 285, and/or the display connection 295, may be wireless connections.

The electronic control circuitry 290 may register the position of the focus mechanism 230 as it changes to focus at a different range. A law relating the movement of the focus lens 230 to the range at which the II objective 220 is focused may be stored within the electronic control circuitry 290, as is discussed further below. For example, the law that is stored may relate the movement of the focus lens to the desired parallax correction, and may relate the voltage across a rotary potentiometer, which measures the position of the focus lens 230.

It is desirable that the second objective 220 is passively athermalised so that any change in the position of the focus mechanism 230 is known to be purely related to a change in distance of the object 201, rather than correcting for a thermal defocus of objective 220. In addition, any focus offsets used to correct for manufacturing tolerances of the second objective 220 should preferably be incorporated into the range finding calculation, for example, such an offset may be added to or subtracted from the recorded position of the focus mechanism 230. This requires that the same focus offset can be used to correct the manufacturing tolerances of the second objective under all conditions, for example, over the full temperature range and for all object distances.

As mentioned above, a law relating the parallax error for the thermal objective at a given range is also stored in the electronic control circuitry 290. The law may directly relate the focus lens position to the required parallax correction. Although the range is the value which links the focus lens position to the required parallax correction, the range may not be directly calculated as the range is not specifically required. As a result, the electronic control circuitry 290 is able to offset the image on the display 270 by the correct amount to correct for the parallax error when the images are combined in the image blender 250.

Under the first embodiment, the correction may be determined in terms of pixels as the image being moved is on a pixelated display. The correction is a translation of one of the images relative to the other. For alternative embodiments, this translation may be converted into appropriate units to perform the correction, dependent upon the correction method that has been implemented. The image position may be corrected by displacing the beam splitter prism 250 along the axis of the collimator 260, for example. In that case, the correction may be in terms of a signal, for example, voltage, to be sent to a linear actuator.

The collimator optics 260 aid viewing the display 270 and the II tube 245 output using, for example, an auxiliary sight (not shown). As noted above, in alternative embodiments the collimator optics 260 may be exchanged for an eyepiece or magnifier optics, an image detector, other optical elements, or omitted completely. Similarly, in alternative embodiments, the display 270, II tube 245 and beam splitter 250 may be substituted for by other elements, or omitted, although the parallax error may not be evident without some method of displaying the images from the two objectives 210, 220 in a blended or fused manner.

Figure 3:
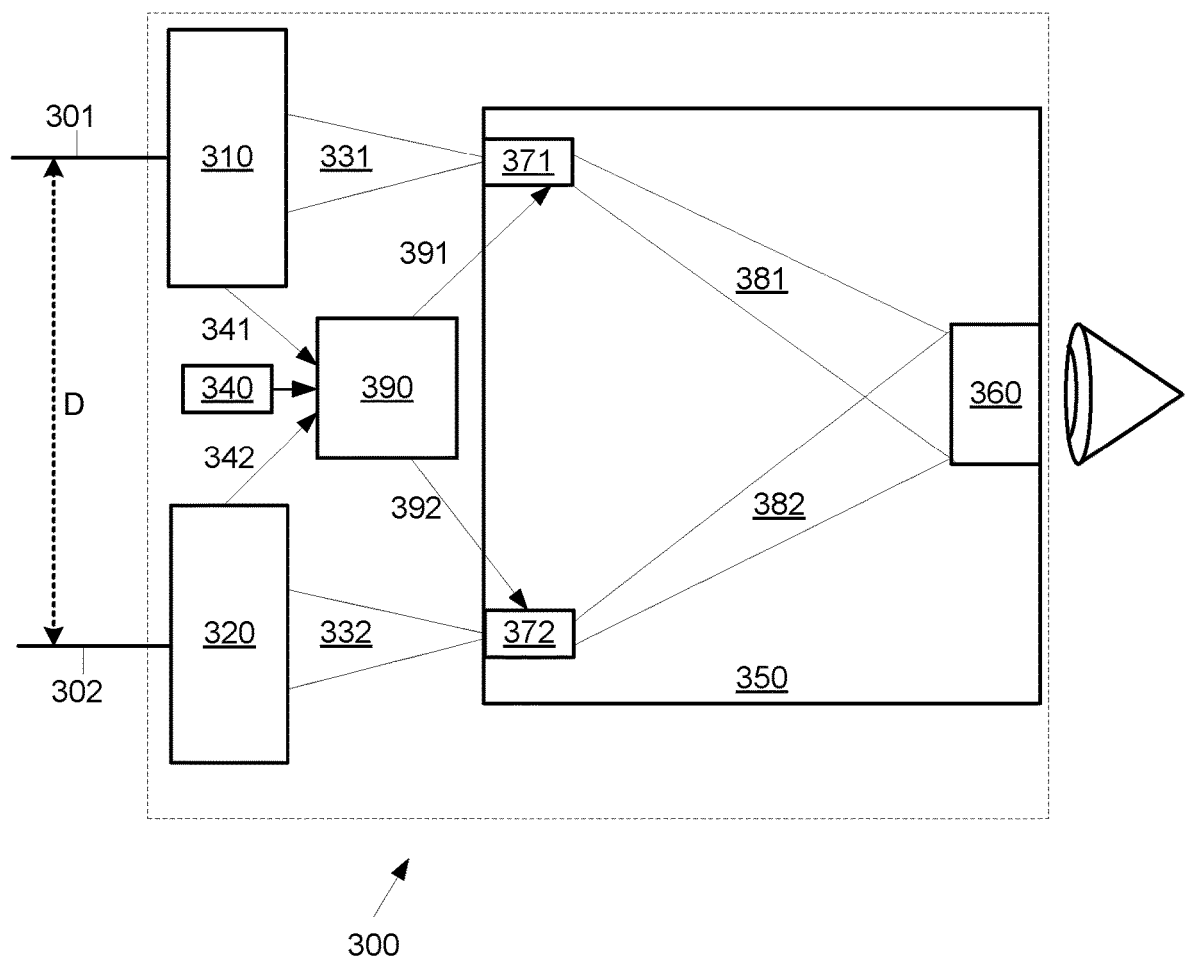
FIG. 3 is a schematic diagram of an exemplary second embodiment of an optical system for correcting parallax errors over a range of temperatures.

FIG. 3 shows a second embodiment of the invention based upon a blended optical system. Under the second embodiment 300 there are at least two optical systems 310, 320 with optical axes 301, 302 separated by a distance D, conveying outputs 331, 332 to detectors 371 and 372 respectively. While the optical systems 310, 320 may include optical and/or thermal objectives, the two optical systems 310, 320 need not be thermal and II objectives, and the detectors 371, 372 need not be a thermal camera and/or an II tube as per the first embodiment.

The first optical system 310 may convey first range information 341 for a target to an electronic control circuitry 390. The first range information 341 may be an actual calculated distance, or may be information about a focusing mechanism (not shown) within the first optical system 310, for example, a position of a focusing lens, or a combination thereof. The first range information 341 may also include thermal data as described further below, such as a temperature measurement, to be used by the control circuitry 390 to calculate the thermal defocus of the first optical system 310. The first optical system 310 conveys the output 331 to the first detector 371. The output 331 may be an optical image, or output 331 may be data that may be converted into a first optical image 381 by the first detector 371. The electronic control circuitry 390 may be implemented, for example, by a computer, as discussed further below.

A thermal sensor 340, or a number of thermal sensors, may be in communication with the electronic control circuitry 390. The thermal sensor 340 may be, for example, a thermistor or thermopile. The thermal sensor 340 may also be integrated with the first objective 310 and/or the second objective 320. As mentioned above, thermal defocus may occur when a housing of the first objective 310 and/or second objective 320 changes due to a change in thermal conditions. The thermal sensor 340 is configured to detect thermal conditions that may contribute to thermal defocus of the first objective 310 and/or the second objective 320. For example, the thermal sensor 340 may be configured to determine the ambient temperature at the first objective 310 and/or second objective 320, and/or the temperature of the housing of the first objective 310 and/or second objective 320.

The second optical system 320 may convey range information 342 for a target to the electronic control circuitry 390. The second range information 342 may be an actual calculated distance, or may be information about a focusing mechanism (not shown) within the second optical system 320, for example, a position of a focusing lens, or a combination thereof. The second range information 342 may also include thermal data, such as a temperature measurement collected by the thermal sensor 340, to be used by the control circuitry 390 to calculate the thermal defocus of the second optical system 320. The second optical system 320 conveys an output 332 to the second detector 372. The output 332 may be an optical image, or the output 332 may be data that may be converted into a second optical image 382 by the second detector 372.

The first optical image 381 and the second optical image 382 are combined by an optical blender 350, such that the first optical image 381 and the second optical image 382 are overlaid at an image collector 360, for example, an eyepiece, a collimator, or an image detecting device, among other possible image collectors. The position of the first optical image 381 may be adjusted by the first detector 371 based upon a first control signal 391 received from the electronic control circuitry 390. Alternatively, or in addition, the position of the second optical image 382 may be adjusted by the second detector 372 based upon a second control signal 392 received from the electronic control circuitry 390. The adjustment by the first detector 371 and/or the second detector 372 results in the blended image at the image collector 360 being adjusted to correct for parallax errors.

It should be noted that the second optical system 320 may have a fixed focus, in which case the second range information 342 and second control signal 392 may be omitted, as per the first embodiment, where one of the objectives described is a fixed-focus objective. In this case, the second optical system 320 must also be passively athermalised in order to maintain focus over the operating temperature range. While this may simplify the system 300, it is not necessary for the purposes of the second embodiment. More generally, under the second embodiment 300 both objectives 310, 320 may include a focus mechanism. In this case, the focus mechanisms may be linked such that both objectives 310, 320 are focused at the same range at all times, so that the range for which the parallax needs to be corrected by the electronic circuitry 390 is always known.

Furthermore, the objectives 310, 320 need not be passively athermalised. As long as it is possible to determine what portion of the focus movement is being used to refocus for a given range, then the second embodiment will properly correct for parallax errors. This may be achieved, for example, through the use of temperature sensors within the objectives 310, 320. By characterizing the thermal defocus as a function of the temperatures recorded by the sensors, the proportion of the focus movement that is used to refocus for the object range may be calculated. When neither objective 310, 320 is passively athermal, and a linked focus mechanism is used to refocus the objectives 310, 320 for both changes in target range and thermal defocus, the objectives 310, 320 are designed such that a first ratio between the focus movements required to focus each objective 310, 320 for a change in target range matches a second ratio between the focus movements required to focus each objective 310, 320 for a change in temperature. The depth of focus of at least one of the objectives 310, 320 should be sufficiently small to use a focus mechanism in order to resolve target objects at different ranges.

Both of the objectives 310, 320 and their associated detectors 371, 372 may be configured to detect any waveband. If one of the wavebands is visible, then a corresponding detector 371, 372 for the corresponding objective 310, 320 may be omitted. In addition, it is not necessary for just one of the detectors 371, 372 to create an electronic image, as in the first embodiment. Both, or neither, of the detectors 371, 372 can produce an electronic image, with the method of displaying said image changing to suit the application, as long the images are blended or overlaid in some manner, for example by the optical blender 350, such that any parallax errors can be seen.

In some scenarios, the determination of best focus may be carried out by an electronically implemented process, for example, with the electronic control circuitry 390. The position of the focus mechanism, for example, within objectives 310, 320, can be used to determine the necessary parallax correction. It is desirable that the depth of focus be sufficiently small that a focus mechanism is required in order to resolve objects at different ranges. However, this does not necessarily require the focusing to be performed by a user. The above embodiments remain applicable if an electronic auto-focus algorithm can determine that a focus adjustment is required, based upon a captured image. Note that as a result the image from the objective with the sufficiently small depth of focus should be captured electronically.

It should be noted that, in the case where more than one image is captured electronically, this process may be applied in reverse. Instead of using the auto-focus algorithm to generate a parallax correction, an estimation of the parallax error may be used to determine the correct focus position. By electronically comparing the captured images 381, 382, and determining the offset which minimizes the structural differences between them, a prediction of the object distance can be made. This predictive value may be used to refocus the objective(s) 310, 320. Alternatively, the two methods can be used together to improve the confidence with which a range prediction is made. The relative sensitivity of a given optical system to parallax errors and focus errors determines which of these methods is preferable for a given application.

For an optical system such as the first embodiment, where not all of the detectors generate electronic images, the images are blended or overlaid optically. The image blending/overlaying may be achieved, for example, using beam splitters, as described previously. Alternatively, transparent displays, for example, using OLED technology, may be used. The correction succeeds as long as the position of one or more of the images on the display is controlled and matched to the parallax correction.

While multiple electronic images may be blended optically as well using separate displays, it is also possible to electronically blend the images. A variety of blending algorithms are available, but for the purposes of the abovementioned embodiments only the position of the images need be adjusted to correct for the parallax error.

The images do not necessarily need to be adjusted electronically. In alternative embodiments, the position of the display may be adjusted physically, for example, using piezo-electric actuators. Similarly, even if none of the objectives uses a detector to produce an electronic image, for example, for a blended optical system with a visible objective and a separate near infrared (NIR) objective using an II tube, the embodiment is still applicable if the position of one of the images is adjusted, through the physical movement of a lens or prism for example, in order to remove any parallax error. In such an embodiment, the signals 341, 342, 391 and 392, and the electronic control circuitry 390, may be replaced by mechanical linkages. As detailed earlier, there are a number of options for the display optics, including no optics at all, all of which fall within the remit of these embodiments.

As described above, the objectives and their associated detectors may be changed without affecting the underlying function of the embodiments. The wavebands of the objectives can cover any portion of the electromagnetic spectrum: ultraviolet, visible, NIR, short wave infrared, mid-wave infrared, long wave infrared, far infrared, et cetera. Indeed, any emission that can be remotely detected and is directional, such as sound, may be used, provided there is a method by which that information can be displayed.

The objectives in the first and/or second embodiment may be purely refractive (dioptric). However, purely reflective (catoptric) objectives, or objectives utilising both refractive and reflective components (catadioptric) are also possible. Also, alternative embodiments may include two, three, four, or more objectives.

Other embodiments are also possible. Since the abovementioned embodiments may be thought of as rudimentary range finders, in alternative embodiments the calculated range may be displayed to the user. The accuracy of this information will depend greatly on the depth of focus of the objective and on accuracy to which the objective can be focused. To this end an objective with an annular pupil, for example, as results from a central obscuration in catoptric or catadioptric objectives, can make it easier to determine the best focus.

Preferably, the parallax error in the system will be negligible over the object range that lies within the depth of focus of the objective. This can be achieved in a number of different ways, but typically it is preferable if the separation between the optical axes is minimized, and the focal length and numerical aperture of the objective(s) using the focus mechanism are maximized. The materials used for the optics are preferably suitable for the wavebands being imaged, and similarly suitable choices should made to achieve passive athermalisation if required.

Figure 4:
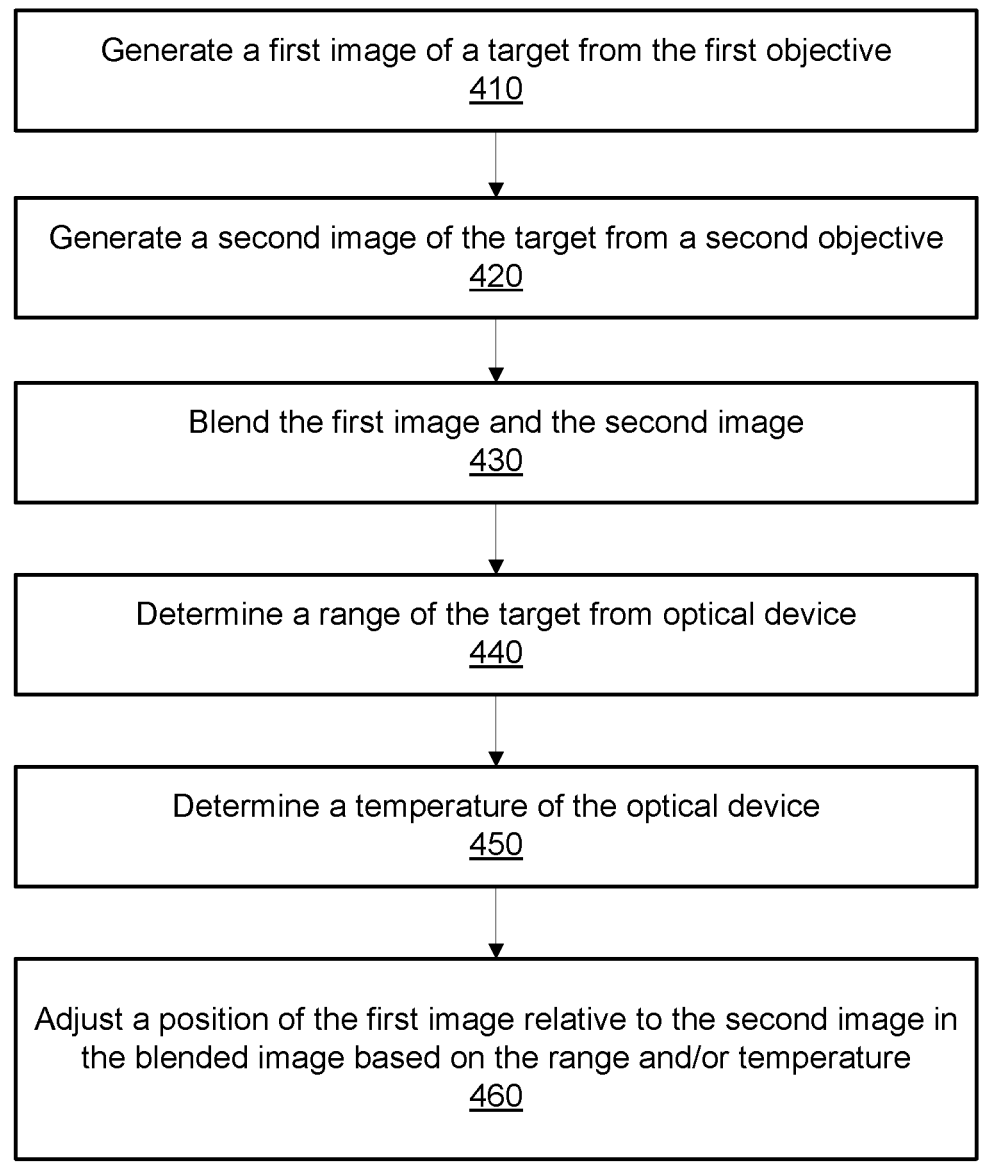
FIG. 4 is a flowchart of an exemplary method for correcting parallax errors in a blended optical device over a range of temperatures.

FIG. 4 is a flowchart of an exemplary method for correcting parallax and thermal errors in a blended optical device. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

An optical device, as described referencing the second embodiment shown in FIG. 3, includes a first objective 310 having a first optical axis 301 and a second objective 320 having a second optical axis 302. A first image 381 of a target from the first objective 310 is generated, as shown by block 410. A second image 382 of the target from a second objective 320 is generated, as shown by block 420. The first image 381 and the second image 382 are blended, as shown by block 430, for example, with an optical image blender 350. A range of the target from optical device 300 is determined, as shown by block 440. The range of the target is calculated from the setting position of the focus mechanism used to generate a focused image of the target. A temperature of the optical device 300 may also be determined, as shown by block 450. The focus setting required to correct the thermal defocus at this temperature is calculated and this value is subtracted from the focus mechanism position used in block 440. A position of the first image 381 relative to the second image 382 in the blended image is determined, based on the range and/or temperature as shown by block 460.

As mentioned previously the order of the blocks of FIG. 4 may be different from the order presented. For example, the steps of optionally determining the temperature of the optical device, determining a range to the target, generating a first image of the target from the first objective, and generating a second image of the target from the second objective may occur in parallel. Thereafter the position of the first image relative to the second image is blended based on the range and/or temperature.

Figure 5:
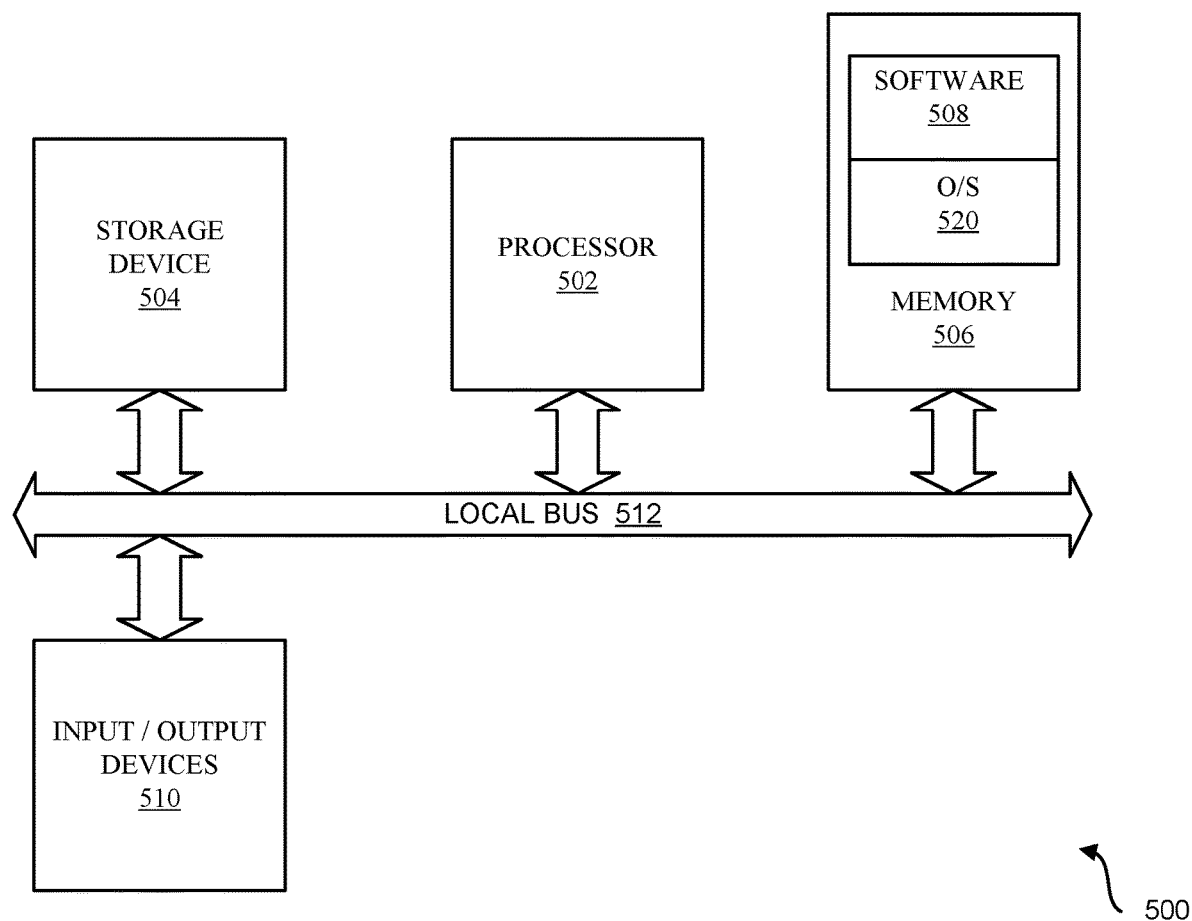
FIG. 5 is a schematic diagram illustrating an example of a system for executing functionality of the present invention.

As previously mentioned, the present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a hand or finger controlled actuator, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Returning to FIG. 2, in experiments using a device 200 according to the first embodiment, a 25.4 mm focal length thermal objective 210 was focused onto an uncooled detector 280 with a pixel pitch of 17 µm. In addition, a 67.235 mm focal length II objective 220 was focused onto an II tube 245. The apertures of these two objectives 210, 220 were separated vertically by 40 mm, and the optical axes of the two systems were parallel. The electronic control circuitry 290 electronically scaled the image from the thermal camera 280 by a factor of three, and displayed on an organic light emitting diode display 270 with a pixel pitch of 15 µm. Scaling the thermal image matched the thermal image to the II image.

Both objectives 210, 220 were nearly free of distortion. The objectives 210, 220 measured less than 0.1% barrel distortion over the whole field-of-view for the II objective 220, and less than 0.12% barrel distortion for the thermal objective 210. 0.12% distortion at the edge of the field-of-view equates to less than one quarter of a pixel on the thermal camera 280 so this distortion was effectively negligible. As a result, any realignment of the two images relative to each other realigned the image over the whole field-of-view. If significantly different amounts of distortion had existed between the two images, then the images would have had to have been realigned by different amounts at each point in the field-of-view.

An aim of the first embodiment was for the parallax correction to work for object distances from infinity down to 5 m. At 5 m, a point which is in line with the optical axis of the II objective is at an angle of 8 milliradians below the optical axis of the thermal objective. Given that the thermal objective is almost distortion-free, a person having ordinary skill in the art will recognize that this equates to an offset on the thermal camera of just under 12 pixels.

As the image realignment occurred on the display, where each thermal camera pixel was mapped onto three display pixels, the parallax correction had a resolution of one-third of a thermal camera pixel. In this way, 36 levels of adjustment were possible for the range from infinity to 5 m.

The object distances corresponding to each of these 36 offsets of one-third of a thermal camera pixel were calculated. The movement of the II objective focus lens required to refocus at each of these object distances was then calculated.

The focus mechanism for the II objective was driven by an eccentric that converts the rotation of the focusing control into the linear motion of the focusing lens. At assembly, the position of the eccentric was set to ensure that the relationship between the rotation of the control and the motion of the lens was approximately linear. As such, each of the calculated II focus lens movements was mapped onto a rotation of the focus control.

A rotary potentiometer was attached to the focus control, and the electronic control circuitry was thereby able to determine the rotational position of the focus control in terms of a measured voltage. At assembly the voltage reading corresponding to the focus setting for an object at infinity was measured and stored within the electronic control circuitry. This focus setting therefore included a focus offset to correct for the manufacturing tolerances of the II objective.

The electronic control circuitry 290 took the difference between the measured voltage and the stored infinity setting voltage, and this was used as the input into a look-up table stored within the electronic control circuitry 290. This look-up table converted the voltage difference into a display pixel offset, via the various mappings previously calculated. The electronic control circuitry 290 used this offset value to adjust the position of the thermal image on the display 270. In this way, the parallax offset was removed, and the two images presented to the collimator 260, via the beam splitter prism 250, were aligned.

This process was very fast, and was applicable without introducing any additional lag to the displayed image. Table 1 summarizes the various relationships described above.

TABLE 1

| Object distance (m) | Angle into thermal objective (mrad) | Parallax error (display pixels) | II focus lens movement (mm) | II focus control rotation (°) | Rotary potentiometer measurement (V) |
|---|---|---|---|---|---|
| Infinity | 0.00 | 0 | 0.00 | 0.0 | 0 |
| 179 | 0.22 | 1 | 0.04 | 1.5 | 5 |
| 90 | 0.45 | 2 | 0.08 | 3.0 | 9 |
| 60 | 0.67 | 3 | 0.12 | 4.4 | 14 |
| 45 | 0.89 | 4 | 0.15 | 5.9 | 18 |
| 36 | 1.11 | 5 | 0.19 | 7.3 | 23 |
| 30 | 1.34 | 6 | 0.23 | 8.7 | 27 |
| 26 | 1.56 | 7 | 0.27 | 10.1 | 31 |
| 22 | 1.78 | 8 | 0.31 | 11.5 | 36 |
| 20 | 2.01 | 9 | 0.35 | 12.9 | 40 |
| 18 | 2.23 | 10 | 0.38 | 14.3 | 44 |
| 16 | 2.45 | 11 | 0.42 | 15.6 | 48 |
| 15 | 2.67 | 12 | 0.46 | 17.0 | 53 |
| 14 | 2.90 | 13 | 0.50 | 18.3 | 57 |
| 13 | 3.12 | 14 | 0.53 | 19.7 | 61 |
| 12 | 3.34 | 15 | 0.57 | 21.0 | 65 |
| 11.2 | 3.57 | 16 | 0.61 | 22.4 | 69 |
| 10.6 | 3.79 | 17 | 0.65 | 23.7 | 73 |
| 10.0 | 4.01 | 18 | 0.68 | 25.0 | 78 |
| 9.4 | 4.24 | 19 | 0.72 | 26.4 | 82 |
| 9.0 | 4.46 | 20 | 0.76 | 27.7 | 86 |
| 8.5 | 4.68 | 21 | 0.79 | 29.0 | 90 |
| 8.2 | 4.90 | 22 | 0.83 | 30.3 | 94 |
| 7.8 | 5.13 | 23 | 0.87 | 31.7 | 98 |
| 7.5 | 5.35 | 24 | 0.90 | 33.0 | 102 |
| 7.2 | 5.57 | 25 | 0.94 | 34.3 | 106 |
| 6.9 | 5.80 | 26 | 0.98 | 35.7 | 111 |
| 6.6 | 6.02 | 27 | 1.01 | 37.0 | 115 |
| 6.4 | 6.24 | 28 | 1.05 | 38.4 | 119 |
| 6.2 | 6.46 | 29 | 1.09 | 39.7 | 123 |
| 6.0 | 6.69 | 30 | 1.12 | 41.1 | 127 |

TABLE 1-continued

| Object distance (m) | Angle into thermal objective (mrad) | Parallax error (display pixels) | II focus lens movement (mm) | II focus control rotation (°) | Rotary potentiometer measurement (V) |
|---|---|---|---|---|---|
| 5.8 | 6.91 | 31 | 1.16 | 42.4 | 132 |
| 5.6 | 7.13 | 32 | 1.19 | 43.8 | 136 |
| 5.4 | 7.36 | 33 | 1.23 | 45.2 | 140 |
| 5.3 | 7.58 | 34 | 1.27 | 46.6 | 144 |
| 5.1 | 7.80 | 35 | 1.30 | 48.0 | 149 |
| 5.0 | 8.02 | 36 | 1.34 | 49.4 | 153 |

The following details regarding the effect of thermal focus shift illustrate the importance of considering the effect of thermal defocus when attempting to perform parallax correction based upon a focus setting position. The use of the focus setting position to correct for a parallax error relies upon being able to correlate the focus setting position to a given range, or object distance). If the lens being focused also loses focus due to thermal perturbations (changes to the refractive indices of the lenses and material expansion in both the lenses and the housings in which they are mounted), then the focus setting position becomes dependent upon the temperature change as well as a change in object distance.

The amount of thermal defocus, and therefore the amount of focus lens movement required to correct for it, depends on the lens design in question. For example, a plastic singlet in a metal housing may typically exhibit a significant amount of thermal defocus, as the focal length of the plastic lens changes much more than the housing expands. Similarly, a glass singlet in a plastic housing tends to lose focus with temperature, for the opposite reasons.

However, it is possible to create athermal lens designs, such as lens designs which do not lose focus with temperature, using plastic lenses in metal housings, or using glass lenses in plastic housings, or any such mix. The practice of athermalising optical designs is well understood, requiring only that the thermal properties of the various materials are known.

Even if a lens is not athermal, parallax correction is still achievable if the thermal defocus contribution to the focus setting position can be determined. This becomes difficult if there are significant cross-terms and/or if the relationships are highly non-linear.

As an example, a lens of a very similar design to the II objective in the first embodiment was selected. In this case, however, the lens design was not athermalised as the focus lens was intended to be used for both close focus and thermal defocus correction. The table 2 below details the focus lens movements required to refocus for a set of different conditions, which represent the extreme values of the object distance and temperature ranges.

TABLE 2

| | Focus lens movement to refocus at temperature | | |
|---|---|---|---|
| Object distance | +20° C. | +70° C. | −40° C. |
| Infinity | 0.000 mm | 0.250 mm | 0.375 mm |
| 10 m | 1.045 mm | 1.300 mm | 1.340 mm |

The first observation is that all of the movements are in the same direction, so that the focus lens movements are not linear with respect to temperature. Secondly, the amount of refocusing required to correct for the thermal defocus is relatively large compared to the movement required for close focus. For example, the 0.375 mm of focus movement required to correct for a drop of 60° C. is the same as the focus correction required to refocus from 10 m to 15.7 m at +20° C. This would have been equivalent to a parallax error of more than 6 display pixels (or 2 detector pixels) in the first embodiment.

Finally, there are also small cross-terms between the movement required to refocus at 10 m and the temperature. At +70° C. the movement for close focus is 1.050 mm, while at −40° C. movement for close focus is 0.965 mm. If the 0.965 mm value is used at +70° C., it is equivalent to being focused at 9.4 m, while the 1.050 mm shift at −40° C. equates to an object distance of 10.6 m. These errors are not large, but both would have resulted in a parallax error of one display pixel in the first embodiment. For comparison, an image misalignment of 2.25 display pixels or greater is considered to be unacceptable for this embodiment.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A blended optical device, comprising:
   a first objective, comprising a first axis and a first image position adjustment means configured to adjust the position of a first image collected by the first objective;
   an electronic control circuitry configured to control the first adjustment means to adjust a position of the first image;
   a second objective, comprising a second axis and a variable focus mechanism;
   a thermal sensor in communication with the electronic control circuitry; and
   a blender configured to form a blended image from the first image and a second image collected by the second objective,
   wherein the first objective and/or the second objective are not passively athermalised, the electronic control circuitry is configured to receive thermal data and range data from the second objective regarding a range to a target of the second objective and adjust the position of the first image so that the blended image is corrected for thermal errors and parallax errors.

2. The device of claim 1, wherein the first objective comprises a fixed focus.

3. The device of claim 1, wherein the first objective comprises a variable focus mechanism.

4. The device of claim 3, wherein the first focus mechanism is linked with the second focus mechanism.

5. The device of claim 4, wherein;
   the linked focus mechanism is configured to refocus the first objective and the second objective for changes in target range and thermal defocus; and
   a first ratio between the focus movements of the first objective and the second objective used to focus each objective for a change in target range matches a second ratio between the focus movements of the first objective and the second objective used to focus each objective for a change in temperature.

6. A method for correcting parallax errors in a blended optical device over a range of temperatures, comprising a first objective having a first optical axis and a second objective having a second optical axis, comprising the steps of:

generating a first image of a target from the first objective;
generating a second image of the target from a second objective;
blending the first image and the second image;
adjusting the focus setting of the first and/or second optical objective due to a change in temperature; and
adjusting a position of the first image relative to the second image in the blended image based on the range and temperature.

7. The method of claim 6, further comprising the step of determining a range of the target from optical device.

8. The method of claim 6, further comprising the step of determining a temperature of the optical device.

9. The method of claim 6 wherein the first objective and/or the second objective is passively athermalised.

10. The method of claim 6, wherein the first objective comprises a fixed focus.

11. The method of claim 6, wherein the first objective comprises a variable focus mechanism.

12. The method of claim 11, wherein the first focus mechanism is linked with a second focus mechanism.

13. The method of claim 11, wherein the first focus mechanism and/or a second focus mechanism further comprises an electronic auto-focus.

14. The method of claim 13, further comprising the steps of:
estimating a parallax error between the first objective and the second objective; and
determining a correct focus for the first and/or second objective based at least in part upon the parallax error.

* * * * *